United States Patent
Wittner

(10) Patent No.: US 11,559,937 B2
(45) Date of Patent: Jan. 24, 2023

(54) POLYPROPYLENE FOR ADDITIVE MANUFACTURING (3D PRINTING)

(71) Applicant: Lummus Novolen Technology GmbH, Mannheim (DE)

(72) Inventor: Manfred Wittner, Mannheim (DE)

(73) Assignee: LUMMUS NOVOLEN TECHNOLOGY GMBH, Mannheim (DE)

(*) Notice: Subject to any disclaimer, the term of this patent is extended or adjusted under 35 U.S.C. 154(b) by 274 days.

(21) Appl. No.: 15/680,880

(22) Filed: Aug. 18, 2017

(65) Prior Publication Data
US 2018/0056584 A1    Mar. 1, 2018

Related U.S. Application Data

(60) Provisional application No. 62/381,196, filed on Aug. 30, 2016.

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/106* (2017.08); *B33Y 10/00* (2014.12);
(Continued)

(58) Field of Classification Search
None
See application file for complete search history.

(56) References Cited

U.S. PATENT DOCUMENTS

| 5,416,169 A | 5/1995 | Saito et al. |
| 5,648,450 A | 7/1997 | Dickens, Jr. et al. |

(Continued)

FOREIGN PATENT DOCUMENTS

| CN | 1223678 A | 7/1999 |
| CN | 103497414 A | 1/2014 |

(Continued)

OTHER PUBLICATIONS

Encyclopedia Britannica, Inc 2015. https://www.britannica.com/science/viscosity (Year: 2015).*

(Continued)

*Primary Examiner* — Timothy Kennedy
*Assistant Examiner* — Farah Taufiq
(74) *Attorney, Agent, or Firm* — Osha Bergman Watanabe & Burton LLP

(57) ABSTRACT

A process and printer systems for printing a three-dimensional object are disclosed. The processes may include providing a non-crosslinked peroxydicarbonate-branched polypropylene filament, flake, pellet, or powder adapted for one of a fused deposition modeling (ARBURG Plastic Freeforming) printer or a fused filament fabrication printer; and printing the non-crosslinked peroxydicarbonate-branched polypropylene with fused deposition modeling (ARBURG Plastic Freeforming) printer or a fused filament fabrication printer to form a three-dimensional article. The printer systems may include one or more print heads for printing a polymer provided in filament, powder, flake, or pellet form to form a three-dimensional article; and one or more feed systems for providing a non-crosslinked peroxydicarbonate-branched polypropylene to a respective print head.

11 Claims, 6 Drawing Sheets

(51) Int. Cl.
| | | |
|---|---|---|
| *B29C 64/209* | (2017.01) | |
| *B29C 64/106* | (2017.01) | |
| *B33Y 30/00* | (2015.01) | |
| *B33Y 70/00* | (2020.01) | |
| *B33Y 80/00* | (2015.01) | |
| *C08F 210/06* | (2006.01) | |
| *B29K 23/00* | (2006.01) | |
| *B29C 64/336* | (2017.01) | |
| *B29C 64/321* | (2017.01) | |

(52) U.S. Cl.
CPC .............. *B33Y 30/00* (2014.12); *B33Y 70/00* (2014.12); *B33Y 80/00* (2014.12); *C08F 210/06* (2013.01); *B29C 64/209* (2017.08); *B29C 64/321* (2017.08); *B29C 64/336* (2017.08); *B29K 2023/10* (2013.01); *B29K 2023/12* (2013.01); *B29K 2995/0046* (2013.01); *B29K 2995/0077* (2013.01); *B29K 2995/0089* (2013.01)

(56) References Cited

U.S. PATENT DOCUMENTS

| | | | |
|---|---|---|---|
| 6,004,124 | A | 12/1999 | Swanson et al. |
| 6,103,833 | A | 8/2000 | Hogt et al. |
| 6,323,289 | B1* | 11/2001 | Hogt ............... C08K 5/14 525/387 |
| 2002/0043643 | A1 | 4/2002 | Korehisa et al. |
| 2004/0249008 | A1* | 12/2004 | Lee ............... B29C 44/3461 521/134 |
| 2011/0245425 | A1 | 10/2011 | Han et al. |
| 2012/0070619 | A1* | 3/2012 | Mikulak ............. B29C 67/0055 428/156 |
| 2015/0336292 | A1 | 11/2015 | Mikulak et al. |
| 2016/0016360 | A1 | 1/2016 | Moris et al. |
| 2016/0200024 | A1 | 7/2016 | Kim et al. |
| 2016/0229122 | A1* | 8/2016 | Bienzobas Saffie ............... G05B 19/4099 |
| 2016/0271876 | A1* | 9/2016 | Lower ............... B29C 64/386 |
| 2018/0104744 | A1 | 4/2018 | Spanke |

FOREIGN PATENT DOCUMENTS

| | | | |
|---|---|---|---|
| CN | 103980402 | A | 8/2014 |
| CN | 104031316 | A | 9/2014 |
| CN | 104211876 | A | 12/2014 |
| DE | 102014113993 | A1 | 3/2016 |
| EP | 0384431 | A2 | 8/1990 |
| GB | 2515348 | A | 12/2014 |
| KR | 20160099125 | A | 8/2016 |
| KR | 20170036249 | A * | 4/2017 |
| WO | 2002096960 | A2 | 12/2002 |
| WO | 2010077394 | A1 | 7/2010 |
| WO | 2015175651 | A1 | 11/2015 |
| WO | 2016036607 | A1 | 3/2016 |
| WO | WO-2017215641 | A1 * | 12/2017 ............. B29C 67/00 |

OTHER PUBLICATIONS

Effect of Temperature on Tensile Properties http://www.engineeringarchives.com/les_mom_effectoftemperatureontensileproperties.html (Year: 2012).*
Office Action issued in corresponding European Application No. 17768681.3, dated Nov. 4, 2020 (5 pages).
International Search Report issued in corresponding International Application No. PCT/EP2017/071675 dated Dec. 8, 2017 (4 pages).
Written Opinion issued in corresponding International Application No. PCT/EP2017/071675 dated Dec. 8, 2017 (10 pages).
Office Action with English Translation issued in corresponding Chinese Application No. 201780053260.7, dated Jul. 1, 2020 (17 pages).
Office Action issued in corresponding European Application No. 17768681.3 dated Oct. 4, 2022 (6 pages).

* cited by examiner

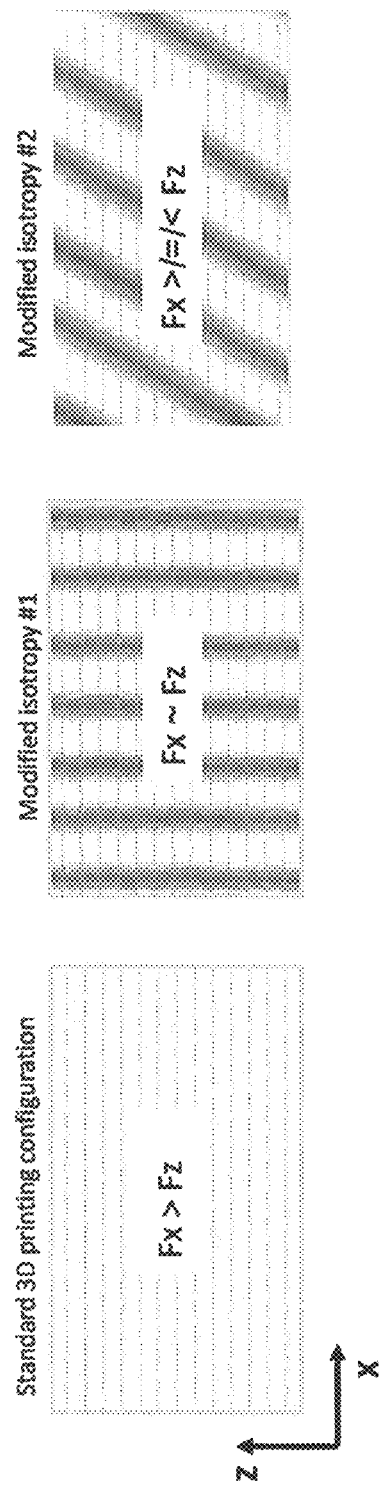

POLYPROPYLENE FOR ADDITIVE MANUFACTURING (3D PRINTING)

CROSS-REFERENCE TO RELATED APPLICATIONS

This Application, pursuant to 35 U.S.C. § 119(e), claims priority to U.S. Provisional Application 62/381,196 filed on Aug. 30, 2016, which is herein incorporated by reference in its entirety.

FIELD OF THE DISCLOSURE

Embodiments disclosed herein relate generally to use of a branched polypropylene for three-dimensional (3D) printing applications. In more specific embodiments, embodiments disclosed herein relate to a non-crosslinked peroxydicarbonate-branched polypropylene and the use of this material for 3D printing applications.

BACKGROUND

Additive Manufacturing (colloquially referred to as 3D printing technology) is one of the fastest growing applications for plastics. There are currently four different methods for additive manufacturing, including fused filament fabrication (FFF), ARBURG Plastic Freeforming (APF), stereolithography (SLA), and selective laser sintering (SLS).

The SLA process requires a liquid plastic resin, a photopolymer, which is then cured by an ultraviolet (UV) laser. The SLA machine requires an excess amount of photopolymer to complete the print, and a common g-code format may be used to translate a CAD model into assembly instructions for the printer. An SLA machine typically stores the excess photopolymer in a tank below the print bed, and as the print process continues, the bed is lowered into the tank, curing consecutive layers along the way. Due to the smaller cross sectional area of the laser, SLA is considered one of the slower additive fabrication methods, as small parts may take hours or even days to complete. Additionally, the material costs are relatively higher, due to the proprietary nature and limited availability of the photopolymers.

The SLS process is similar to SLA, forming parts layer by layer through use of a high energy pulse laser. In SLS, however, the process starts with a tank full of bulk material in powder form. As the print continues, the bed lowers itself for each new layer, advantageously supporting overhangs of upper layers with the excess bulk powder not used in forming the lower layers. To facilitate processing, the bulk material is typically heated to just under its transition temperature to allow for faster particle fusion and print moves, such as described in U.S. Pat. No. 5,648,450.

Fused filament fabrication (FFF) and ARBURG Plastic Freeforming (APF), rather than using a laser to form polymers or sinter particles together, work by extruding and laying down consecutive layers of materials at high temperature, allowing the adjacent layers to cool and bond together before the next layer is deposited. FFF processes typically feed a continuous polymer filament to a print head, re-melting, extruding, and printing the polymer to form the part. APF generally refers to the processes feeding a polymer in powder, flake, or pellet form to a print head, re-melting, extruding and printing the polymer in droplets to form the 3D part.

The FFF and APF desktop and home printing markets, and also the professional and industrial applications, are dominated by ABS (acrylonitrile butadiene styrene), polyamide (PA), and PLA (polylactic acid) as the printed medium.

Polypropylene, which has a lower cost, and a lower density (leading to a lower weight of the printed part) would be a desirable material of choice, but current technology disfavors the use of polypropylene. The drawbacks of currently used polypropylene grades are the lower tensile modulus, lower impact strength, poorer melt strength and higher shrinkage compared to ABS and PLA.

In most 3D printing technologies engineered plastics are used due to their excellent properties in tensile modulus, ductility, melt strength and shrinkage. In comparison to these high cost engineered plastics, polypropylene generally shows slight drawbacks in the mechanical properties, but shows advantages in low temperature printing, density, formation of odorous components (e.g., volatile organic compounds (VOC)).

The prior art practice using polypropylene for direct 3D printing is either a cross-linked material, which requires, beside a peroxide, an additional linking agent, such as a diene in CN103980402 or a silane in CN103497414. Due to poor extrusion capability or even impossible extrudability, the cross-linking process is in most cases made after the printing process, so both patent applications describe the use of the polymer for the widespread SLS technology. A cross-linked polypropylene existing out of an interconnected network showing this very poor extrudability makes a filament production, required for FFF technology, nearly impossible. The poor extrudability inhibits also the use for the APF technology.

GB2515348 discloses a special polypropylene which is flexible at room temperature condition for the production of soft and flexible objects which deform under gravity. Such polymers are not desirable for a large number of applications.

CN104211876 and CN104031316 focus on complex composite compounds of polypropylene with either high loads of starch, oxysilane, microspheres and toughening agents. This further complicates the manufacturing process and increases costs, which are generally not desired.

SUMMARY OF THE DISCLOSURE

Embodiments disclosed herein provide a polypropylene with sufficient melt strength, impact strength/ductility and shrinkage suitable for use of the polypropylene in fused filament fabrication (FFF) or ARBURG Plastic Freeforming (APF) printing systems. The high temperature sensitivity of the flow properties enables the FFF or APF printing of layer or layer sections to influence or compensate the anisotropic characteristics of tensile modulus, shrinkage and impact strength of the FFF or APF printed 3D part.

Embodiments herein relate to a branched polypropylene material produced by applying peroxydicarbonate and the use of this material for FFF and APF 3D printing applications (i.e., embodiments of the disclosure provide for a 3D printing PP grade having desirable characteristics suitable for use in FFF and APF). The FFF and APF printing technologies use in principle the same printing process, the laying down of molten polymer beads/droplets, but differ in how the polymer is fed into the 3D printer. In FFF technology filaments, pre-extruded from the polymer are introduced into the 3D printer, whereas APF is using polymer pellets originated directly from the polymer or compounding plant. The 3D printing PP grade shows improved extrudability, especially as compared to crosslinked polymers, which is especially important for FFF Additive Manufacturing as a pre-extrusion of filaments is required. In addition to being easier to extrude than prior art PP grades, the printed part shows improved toughness or ductility and tensile properties, as compared to existing grades.

Moreover, embodiments of the present disclosure provide for PP grades having increased melt stability, which allows for high resolution and thin-wall part printing. The temperature sensitivity of the 3D printing PP grade may also allow for an in-process change of the polymer flow properties and structure which enables the printing of single layers or layer sections and thus influencing the mechanical properties (tensile modulus and impact strength) and shrinkage in x-y-z dimensions without changing the polymer.

In one aspect, embodiments disclosed herein relate to a process for printing a three-dimensional object. The process may include: providing a non-crosslinked peroxydicarbonate-branched polypropylene filament, flake, pellet, or powder adapted for one of a fused deposition modeling printer or a fused filament fabrication printer. The process also includes printing the non-crosslinked peroxydicarbonate-branched polypropylene with fused deposition modeling printer or a fused filament fabrication printer to form a three-dimensional article.

In another aspect, embodiments disclosed herein relate to an article comprising a non-crosslinked peroxydicarbonate-branched polypropylene formed by the process as described in the paragraph above.

In another aspect, embodiments disclosed herein relate to a fused filament printer system. The system may include: one or more print heads for printing a filament to form a three-dimensional article; and one or more spools for providing a non-crosslinked peroxydicarbonate-branched polypropylene to a respective print head. The one or more print heads may be configured to rapidly change temperature and/or to operate at different temperatures, thereby allowing the system to take advantage of the properties of the non-crosslinked peroxydicarbonate-branched polypropylene.

In another aspect, embodiments disclosed herein relate to a fused deposition modeling system. The system may include: one or more print heads for printing a polymer in powder, flake, or pellet form to form a three-dimensional article; and one or more feed systems for providing a non-crosslinked peroxydicarbonate-branched polypropylene to a respective print head. The one or more print heads may be configured to rapidly change temperature and/or to operate at different temperatures, thereby allowing the system to take advantage of the properties of the non-crosslinked peroxydicarbonate-branched polypropylene.

Other aspects and advantages will be apparent from the following description and the appended claims.

BRIEF DESCRIPTION OF DRAWINGS

FIG. 6A illustrates a component part formed having a uniform polymer structure.

FIGS. 6B and 6C, in comparison, illustrate possible component parts having sections of differing properties that may be produced using a single non-crosslinked peroxydicarbonate-branched polypropylene according to embodiments herein.

DETAILED DESCRIPTION

Fused Filament Fabrication (FFF) and ARBURG Plastic Freeforming (APF), as noted above, are methods of rapid prototyping. The process works by laying down consecutive layers of material at high temperatures, allowing the adjacent layers to cool and bond together before the next layer is deposited.

Figure 1:
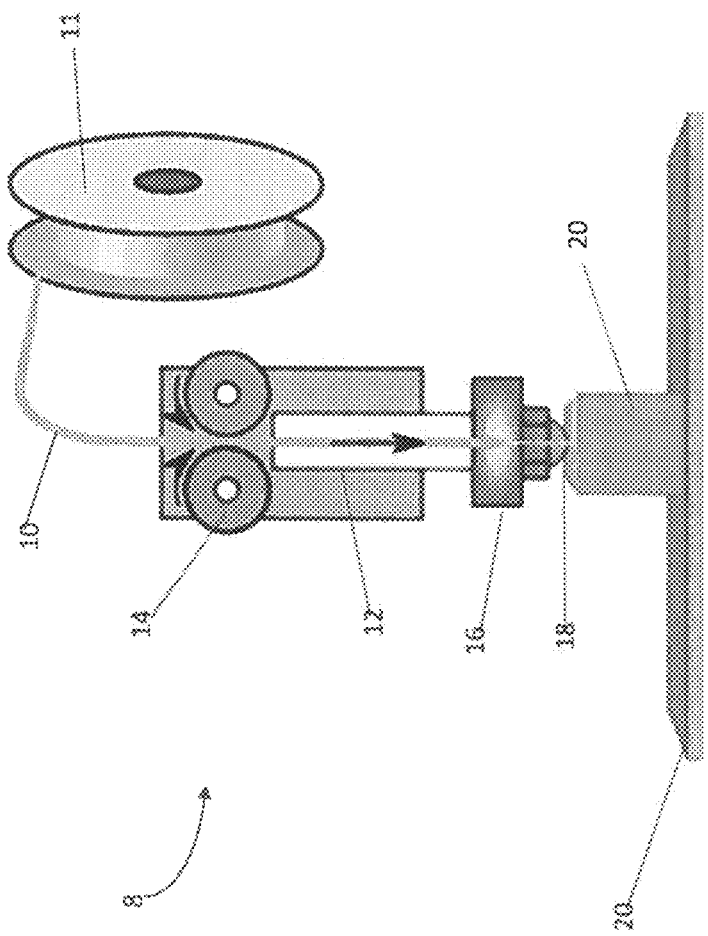
FIG. 1 illustrates a Fused Filament Fabrication system useful in accordance with embodiments herein.
Figure 2:
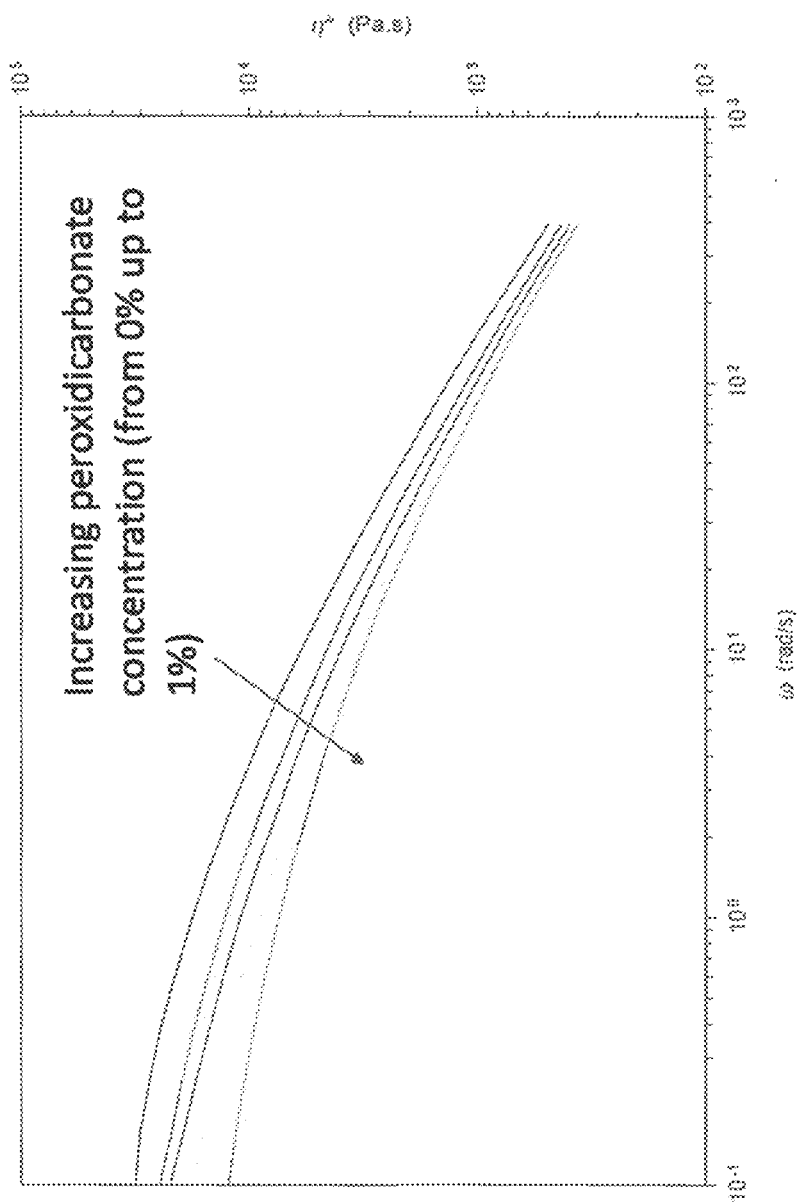
FIGS. 2-5 illustrate various properties of non-crosslinked peroxydicarbonate-branched polypropylenes useful in embodiments herein.

Referring to FIG. 1, during the Fused Filament Fabrication process, a filament 10 may be fed from a spool 11 to an extruder 12. The extruder may use torque and a pinch system 14 to feed and retract the filament as needed. A heater block 16 melts the filament at an appropriate temperature, and the heated filament is forced out of the heated nozzle 18, laying down the extruded material 20 where it is needed. The print head 8 and/or the bed 20 may be moved to the correct X/Y/Z position for placing the material as the printing process proceeds.

While described with respect to a particular type of Fused Filament Fabrication process and illustrating a single spool, those of skill in the art will appreciate that there are many different types of Fused Filament Fabrication systems, many of which may include multiple spools and multiple print heads. Likewise, one skilled in the art may appreciate that ARBURG Plastic Freeforming systems, such as those that may use pellets or flakes of polymer, may similarly extrude and print a polymer into a three-dimensional object.

Embodiments disclosed herein relate to use of a non-crosslinked branched polypropylene to provide one or more of decreased cost, improved extrudability, and ability to vary properties of the printed filament. Embodiments disclosed herein provide a Fused Filament Fabrication or ARBURG Plastic Freeforming process using a non-crosslinked branched polypropylene that may show improved extrudability, which is especially important for FFF and APF Additive Manufacturing. The finished parts formed from non-crosslinked branched polypropylenes according to embodiments herein may exhibit toughness or ductility and tensile properties suitable for FFF and APF. The non-crosslinked branched polypropylenes according to embodiments herein may have a melt stability that may support high resolution and thin-wall part printing. The non-crosslinked branched polypropylenes according to embodiments herein may also have temperature sensitivity, allowing for an in-process change of the polymer flow properties and structure, which enables the printing of single layers or layer sections, and thus influencing the mechanical properties (tensile modulus and impact strength) and shrinkage in x-y-z dimensions, without changing the polymer.

Non-crosslinked branched polypropylenes useful in embodiments herein may include non-crosslinked peroxydicarbonate-branched polypropylenes.

The term "polypropylene" ("PP") as used herein refers to polymers or mixtures of polymers containing at least 50% by weight of polymerized propylene. Polymerization catalysts may be Ziegler-Natta, metallocene or other types of catalysts giving stereospecific polymerization of propylene. Polypropylenes useful in embodiments herein may include homopolymers of propylene; random, alternating, or block copolymers; or random, alternating, or block terpolymers of propylene and another olefin. Generally, a propylene copolymer or terpolymer will contain one or more other olefins, such as ethylene, butene, pentene, hexene, heptene, or octene, but it may also comprise other olefinically unsaturated monomers or combinations of these, such as acrylates, styrene, styrene derivatives, acrylonitrile, vinyl acetate, vinylidene chloride, and vinyl chloride. In some embodiments, the content of olefins other than propylene is less than 30% by weight of the copolymer. In particular embodiments, polypropylenes useful in embodiments herein include homopolymers of propylene, copolymers of propylene and ethylene or mixtures of polypropylene and polyethylene containing not more than 10% by weight of polymerized ethylene.

Branching of the polypropylene may be effected by contact of the polypropylene at an appropriate temperature with a peroxydicarbonate.

Suitable examples of peroxydicarbonates have the formula the formula $R^1$—OC(O)OOC(O)O—$R^2$, wherein $R^1$ and $R^2$ are independently selected from the group consisting of $CH_3$, 2-i-$C_3H_7O$—$C_6H_4$, $C_2H_5CH(CH_3)$, 4-$CH_3$—$C_6H_4$, $Cl_3CC(CH_3)_2$, $C_7H_{15}$, c-$C_6H_{11}CH_2$, 3-t-$C_4H_9$—$C_6H_5$, $Cl_3Si$ $(CH_2)_3$, $C_6H_5$, $CH_3CH(OCH_3)CH_2CH_2$, $C_6H_5OCH_2CH_2$, $C_6H_5CH_2$, Z—$C_8H_{17}CH$=$CH(CH_2)_8$, 2-$CH_3$—$C_6H_4$, $(CH_3)_2CHCH_2CH(CH_3)$, 3,4-di-$CH_3$—$CH_3$, $Cl_3C$, CHCH (Cl), $ClCH_2$, $[C_2H_5OC(O)]_2CH(CH_3)$, 3,5-di-$CH_3$—$CH_3$, $C_8H_{17}$, $C_2H_5$, $C_{18}H_{37}$, 2-oxo-1,3-dioxolan-4-$CH_2$, $C_2H_5CH$ $(Cl)CH_2$, 4-$CH_3O$—$C_6H_4$, i-$C_4H_9$, $CH_3SO_2CH_2CH_2$, $C_{12}H_{25}$, $C_6H_5CH(Cl)CH_2$, $H_2C$=CHC(O)$OCH_2CH_2$, 4-$NO_2$—$C_6H_4$, $C_4H_9$, $C_{10}H_{21}$, $C_4H_9CH(C_2H_5)CH_2$, $H_2C$=$HCH_2$, 2-Cl-c-$C_6H_{10}$, $H_2C$=$C(CH_3)CH_2$, c-$C_6H_{11}$, $ClCH_2CH_2$, 4-$[C_6H_5$—N=N]—$C_6H_4CH_2$, $C_{16}H_{33}$, 1-naphtyl, 4-t-$C_4H_9$—$C_6H_{10}$, 2,4,5-tri-Cl—$C_6H_2$, $Cl(CH_2)_3$, $C_{14}H_{29}$, 9-fluorenyl, 4-$NO_2$—$C_6H_4CH_2$, 2-i-$C_3H_7$—$C_6H_4$, $CH_3OCH_2CH_2$, $H_2C$=$C(CH_3)$, 3-$CH_3$—$C_6H_4$, $BrCH_2CH_2$, 3-$CH_3$-5-i-$C_3H_7$—$C_6H_3Br_3CCH_2$, $C_2H_5OCH_2CH_2$, 4-$CH_3OC(O)$—$C_6H_4$, $H_2C$=CH, i-$C_3H_7$, 2-$C_2H_5CH$ $(CH_3)$—$C_6H_4$, $Cl_3CCH_2$, $C_5H_{11}$, c-$C_{12}H_{23}$, 4-t-$C_4H_9$—$C_6H_4$, $C_6H_{13}$, $C_3H_7$, $CH_3OCH_2CH_2$, $C_6H_{13}CH(CH_3)$, $CH_3OC(CH_3)_2CH_2CH_2$, $C_3H_7OCH_2CH_2$, $CH_3OCH_2CH$ $(CH_3)$, 2-i-$C_3H_7$-5-$CH_3$-c-$C_6H_9$, $C_4H_9OCH_2CH_2$, t-$C_4H_9$, $(CH_3)_3CCH_2$, wherein i=iso, t=tertiary, Z=cis, and c=cyclic.

In some embodiments, the peroxydicarbonate may include bis(4-tert-butylcyclohexyl) peroxydicarbonate, dicetyl peroxydicarbonate, and dimyristyl peroxydicarbonate, which peroxides are solid at room temperature, and diisopropylperoxydicarbonate, di-n-butylperoxydicarbonate and bis(2-ethylhexyl)peroxydicarbonate, which are liquid at room temperature, either pure or as a solution in isododecane. Optionally, a combination of peroxydicarbonates or peroxydicarbonates and other peroxides may be employed in order to influence the melt flow index of the (co)polymer and/or enhance the degree of modification of the (co) polymer.

The quantity of peroxydicarbonate to be used will be dependent on the desired degree of PP modification and on the PP employed. Preferably, use is made of peroxydicarbonate at concentrations of up to about 5 meq (=milliequivalents=millimoles of peroxide) per 100 g PP. For example, peroxydicarbonates may be used at a concentration in the range from a lower limit of 0.05, 0.1, 0.15, 0.2, 0.25 to 1 meq/100 g PP to an upper limit of 5 meq/100 g PP, where any lower limit may be combined with any upper limit. The preferable concentration range is from 0.5 to 3.0 meq/100 g PP. It has been found that the increase of branching produced by addition of up to 0.445 meq/100 g PP peroxydicarbonate (PERKADOX 24L) in the polypropylene reduces the shear viscosity and provides easier flow with less pressure build-up in the die/nozzle, which is beneficial for fast 3D printing. In general, however, it has been found that higher peroxydicarbonate concentrations, such as greater than 0.445 meq/100 g PP leads to an increase of the shear viscosity and hence, higher pressure drop in the die/nozzle. The overall higher pressure drop at concentrations greater than 0.445 meq/100 g PP is owed due to a more pronounced decreasing MFR at these concentration ranges of peroxydicarbonate. This means that the shear viscosity increase due to MFR reduction is stronger than the shear viscosity reduction caused by the more pronounce shear thinning effect with increasing Elasticity ratio or increasing branching respectively.

For example, dosing of 0.09 meq PO/100 g PP (PERKADOX 24L) increases the ER from 1.26 to 1.47 dyn/cm2 without influencing the MFR. Whereas dosing of 0.445 meq/100 g PP (PERKADOX 24L) increases the ER to around 2.7 dyn/cm2 and decreases the MFR from 1.6 to 1.0 g/10 min. This means the minimum dosing of peroxydicarbonate to have an effect on ER is 0.09 meq/100 g PP. As mentioned above this increase of ER does not show an effect on MFR, but has an influence in the shear behavior of the polymer showing easer flow in the thin nozzle of the 3D printer. For the printed product the tensile modulus will increase by approx. 120 MPa by adding 0.09 meq/100 g PP. At slightly higher concentrations a clear increase of both, ER and MFR, can be observed.

This means using PERKADOX 24L concentrations of >0.09 meq/100 g PP show the effect expected by the invention while using the polymer for FFF or APF printing. Another parameter which is influenced by the addition of branches is the recrystallization temperature (Tc). For example, a non-branched random-PP shows a Tc or around 100° C. whereas a non-crosslinked branched random-PP (0.445 meq/100 g PP) shows a Tc of 108° C. This increase of Tc while using peroxidicarbonate (PERKADOX 24L) will show faster solidification during the printing process and will therefore improve the overall process and the exactness of the printed product.

Peroxydicarbonate-branched polypropylenes may be formed, for example, by heating a mixture of polypropylene and peroxydicarbonate. The reaction may be performed, for example, in a fluidized bed, melt-kneader, or an extruder, at a temperature ranging from room temperature up to 300° C., where the temperature conditions may depend upon one or more factors including the half-life temperature of the peroxydicarbonate, the melting point of the polypropylene, and the residence time in the reactor, among other variables. Processes to produce peroxydicarbonate-branched polypropylenes may include use of solid peroxydicarbonates, solutions of peroxydicarbonates in hydrocarbon solvents, and aqueous mixtures or emulsions. Various processes to produce peroxydicarbonate-branched polypropylenes are described in, for example, U.S. Pat. No. 6,323,289, EP0384431, US20020043643, U.S. Pat. Nos. 5,416,169, 6,103,833, US20110245425, WO2010077394, and WO2002096960, among others.

For use in FFF processes, the peroxydicarbonate-branched polypropylene may be extruded, drawn into a filament, and wound on a spool. Filament diameters may be, for example, in the range of 1 to 3 mm in some embodiments. The diameter of the filament desired may depend upon the printer, however, and other diameters may be used.

In other embodiments, a polypropylene may be extruded and drawn into a filament, then infused with a peroxydicarbonate. The peroxydicarbonate and the polypropylene may then react within the extruder of the printing head and heater, resulting in discharge of a non-crosslinked peroxydicarbonate branched polypropylene from the printer head. Likewise, powder, pellets or flakes may be infused with a peroxydicarbonate for feed to an FFF printer.

Embodiments disclosed herein thus provide a process for printing a three-dimensional object. The process may include providing a non-crosslinked peroxydicarbonate-branched polypropylene filament adapted for a fused filament fabrication printer, and printing the filament with the fused filament fabrication printer to form a three-dimensional article. In other embodiments, the process may include providing a non-crosslinked peroxydicarbonate-branched polypropylene, in powder, pellet, or flake form, to a fused deposition modeling printer, and printing the polymer with the fused deposition modeling printer to form a three-dimensional article. Printing of the non-crosslinked peroxydicarbonate-branched polypropylene may occur, for example, at extrusion temperatures in the range from 180° C. to about 300° C. The typical and more preferred temperature range is from 190° C. to about 240° C.

The peroxydicarbonate-branched polypropylene, as noted above, may include a polypropylene branched by reaction with up to 5 meq/100 g PP peroxydicarbonate. For example, the peroxydicarbonate-branched polypropylene comprises a polypropylene branched by reaction with 0.09 meq/100 g PP to 0.445 meq/100 g PP peroxydicarbonate or by reaction with concentrations >0.4450. wt % to 5 meq/100 g PP peroxydicarbonate.

The peroxydicarbonate-branched polypropylene is not cross-linked, prior to, during, or after FFF or APF printing. It has been found that non-crosslinked peroxydicarbonate-branched polypropylenes according to embodiments herein provide an improved extrudability and the ability to vary properties of the printed part, among other advantages.

To take advantage of the properties of the peroxydicarbonate-branched polypropylenes, FFF and APF printers or printing systems may include a control system that may selectively vary the temperature of the extruder, extruder nozzle, or the print head in general, or may be linked to a computer capable of controlling the temperature. By changing the extruder or nozzle temperature, the print speed (residence time in extruder), or other conditions, the extent of branching and the flow properties of the polypropylene may be influenced according to the requirements of the part, as will be explained further below. The ability to influence the properties of the printed polymer may thus provide a printed object having different mechanical sections or fractions from only one polymer.

The extent of branching of a non-crosslinked branched polypropylene is defined by the concentration of peroxydicarbonate and the extrusion conditions (temperature and pressure) during the production of the non-crosslinked branched polypropylene. This means using a certain concentration of peroxydicarbonate and a certain extrusion temperature will create a certain amount of branches on the backbone of the polymer chain. The particular extend of branches during the 3D printing process is subsequently dependent on the actual printing temperature. An increase of the printing temperature will reduce the extent of branching due to decreasing stability of the branches with increasing temperature and hence result in lower ER values, and producing different flow properties and different mechanical properties. This means the maximum branching level of PP is pre-defined by the original concentration of peroxydicarbonate and the extruder settings. The extent of branches can therefore either be maintained at the pre-defined level or be reduced during the 3D printing process depending on the temperature of the printing nozzle. This means for the finish printed part that sections printed with lower temperature will show increased ductility or impact strength whereas sections printed with higher temperature will show increased stiffness.

In some embodiments, a printing system may be provided with a single print head or nozzle which is capable of fast temperature changes. Processes disclosed herein may include varying a temperature of an extruder head of the fused filament fabrication printer to vary a property of the printed filament, thus imparting varied properties in select portions of the three-dimensional article.

In other embodiments, a printing system may be provided with a second or multiple nozzles with different temperature settings. Processes according to such embodiments may include operating the two or more extruder heads at different temperatures to vary a property of the printed filament.

In yet other embodiments, a printing system may be provided with two or more nozzles. A first peroxydicarbonate-branched polypropylene may be provided to a first extruder head, and a second peroxydicarbonate-branched polypropylene may be provided to a second extruder head, and so forth. The polypropylene provided to the respective extruder heads may be the same or different.

For example, the same peroxydicarbonate-branched polypropylene may be provided to each respective head by separate spools, and the extruders may be operated at different temperatures. A computer-based program or control system may then be used to print the peroxydicarbonate-branched polypropylene from a selected extruder to print polymer having a desired property at a desired location, the extrusion temperature driving the property differences in the printed polymer portions.

As another example, different peroxydicarbonate-branched polypropylenes may be provided to each respective head, which may be operated at the same or different temperatures. A computer-based program or control system may then be used to print the peroxydicarbonate-branched polypropylene from a selected extruder to print polymer having a desired property at a desired location, the extrusion temperature and polymer grade (peroxydicarbonate concentration or peroxydicarbonate type) each impacting the property differences in the printed polymer portions.

Embodiments disclosed herein also relate to an article formed at least in part from a non-crosslinked peroxydicarbonate-branched polypropylene. The peroxydicarbonate-branched polypropylenes may be used in FFF and APF 3D printing systems to form virtually any type of article. The printing systems may include, for example, one or more print heads for printing filaments or droplets as appropriate for the system, to form a three-dimensional article, and one or more spools or feed systems for providing a non-crosslinked peroxydicarbonate-branched polypropylene to a respective print head.

As described above, polypropylenes useful in embodiments herein include polypropylenes modified using a certain concentration of peroxydicarbonate without any additional cross-linking agent to generate exclusively chain branching and no cross-linking. In contrast to cross-linked polypropylenes, branched polymers provide the potential of viscose stretching in which dis-entanglement of the polymer chains will occur which is necessary for filament production. In contrast to cross-linked polymers, the high throughput and stable fabrication of filaments with the branched polypropylenes described herein is actually possible, as shown by Rheotens experiments measuring the extensional properties of polymer melts.

In FFF and APF 3D printing, the polymer is extruded through very small diameter nozzles. The non-crosslinked, peroxydicarbonate-branched polypropylenes described herein may show improved flow properties, making the printing easier and faster. Further, it has been observed that the non-crosslinked, peroxydicarbonate-branched polypropylenes described herein show reduced viscosity in the channel of the nozzle and simultaneously provides higher melt strength outside the nozzle compared to other polypropylene resins, including mentioned prior art polymers. The detected properties of the non-crosslinked, peroxydicarbonate-branched polypropylenes described herein make the use in FFF and APF preferable. The branching is subsequently responsible for the claimed improved impact strength and tensile modulus.

The increase of the recrystallization temperature and the higher melt strength of the non-crosslinked, peroxydicarbonate-branched polypropylenes described herein enable a faster 3D printing of high resolution finish parts. Due to the temperature sensitivity of the non-crosslinked, peroxydicarbonate-branched polypropylenes described herein, it is possible to change the branching ratio of the polymer during the 3D printing process. Changing the branching ratio will directly influence the flow properties of the polymer and hence also the impact strength and tensile properties of the final 3D printed part.

Precondition for the change of the branching ratio and MFR is a rapid or very fast temperature adjustment of the FFF APF 3D printing nozzle and/or ducts to the nozzle. The process mode with rapid or very fast nozzle temperature change (or the use of two or multi printing nozzles) enables the printing of layer or layer sections with different mechanical properties. Depending on the arrangement of these layer sections, the anisotropic characteristics of the finished 3D printed part can be adjusted (usually 3D printed parts show very anisotropic performances in the x-y and z dimension). Finally, the concept of rapid nozzle temperature change provides in addition the possibility to print 3D finish products with different behaviors from only one polypropylene grade.

One difference of embodiments herein over currently existing printing systems is that the polypropylene is only branched, not cross-linked. In comparison to cross-linked PP, the non-crosslinked, peroxydicarbonate-branched polypropylenes described herein can be effectively spun into filaments for FFF printing technology or may be readily extruded using APF printing technology. The cross-linked PP requires, besides a peroxide, additional cross-linking agents and processing steps which makes the final polymer less cost efficient. Cross-linked polymers cannot be extruded and are generally excluded from FFF and APF technologies. Additionally, the high temperature sensitivity of the PP during the 3D printing process is not given by cross-linked PP, hence an influence on the anisotropy of the finish part is therefore not possible with cross-linked polypropylenes.

In comparison to standard PP, the non-crosslinked, peroxydicarbonate-branched polypropylenes described herein provides higher impact strength and higher tensile properties. The increased melt stability in comparison to standard PP provided by non-crosslinked, peroxydicarbonate-branched polypropylenes described herein allows for printing with higher resolution and the production of thin-walled parts.

The above-described advantages of the non-crosslinked peroxydicarbonate branched polypropylenes described herein may be illustrated by the following test results. The polypropylene used was random co-polymer with MFR of 0.5 g/10 min and a co-polymer content of 3.2% and was branched with PERKADOX 24L (Dicetyl peroxydicarbonate) as the peroxydicarbonate. The branching process included mixing the polymer powder with a standard stabilizer package and the corresponding concentration of PERKADOX 24L for 4 hours in a tumbling mixer followed by feeding the blend into the extruder. During the extrusion at 190° C. the branching reaction takes place. The changes of the flow properties and the Elasticity Ratio are determined by the temperature of the extrusion and the concentration of the peroxydicarbonate. The non-crosslinked peroxydicarbonate-branched polypropylene strand exiting the extruder die is quenched in a water bath and subsequently pelletized and dried. Without any further work step the pellets are ready to be used for filament extrusion for subsequent FFF printing or can be fed directly into the extruder of the APF printing system.

Figure 3:
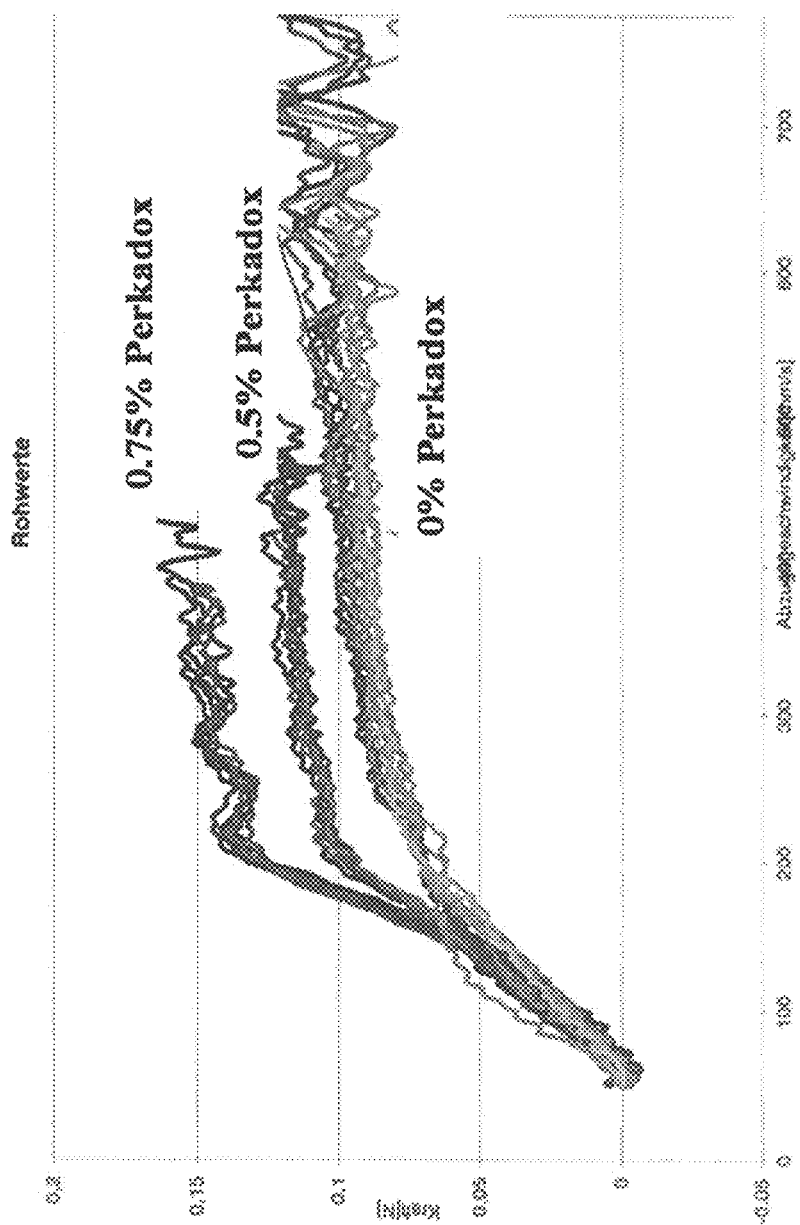

The integrity of a freshly built 3D layer is supported by the higher melt strength of non-crosslinked peroxydicarbonate-branched polypropylenes described herein. FIG. 3, for example, shows the increase of the melt strength with increasing concentration of peroxydicarbonate or branching respectively.

Integrity and fast re-crystallization (higher re-crystallization temperature), which is also supported by the non-crosslinked, peroxydicarbonate-branched polypropylenes described herein, enables the FFF and APF 3D printing of accurate thin-wall parts with high resolution. The re-crystallization temperature, as measured by DSC according to ISO 11357 using a cool down rate of 10° C./min is shown in Table 1.

TABLE 1

| | Concentration Peroxydicarbonate (Perkadox 24 L) [meq/100 g PP] | | | | |
|---|---|---|---|---|---|
| | 0% standard random-PP | 0.445 | 0.875 | 1.32 | 1.75 |
| Re-crystallisation temp. Tc [° C.] | 100.2 | 108.0 | 109.3 | 109.9 | 110.5 |

Table 2 shows the effect of the non-crosslinked, peroxydicarbonate-branched polypropylenes described herein with increasing concentration of peroxydicarbonate or increasing branching, respectively. The improved Tensile modulus and Yield strength in comparison to a standard Polypropylene resin demonstrates the positive effects of the non-crosslinked, peroxydicarbonate-branched polypropylenes described herein on the stability and rigidity of the finish printed part. The increase of the Tensile modulus and Yield strength is occurring without impacting the Charpy impact strength, meaning the ductility of the finished 3D printed part is not negatively influenced. Tensile modulus, tensile yield strength and Charpy Impact were measured by the respective test procedure according to the standards ISO 527-2 for Tensile modulus and Tensile yield strength and ISO 179/1eA for Charpy impact strength.

TABLE 2

| | Concentration Peroxydicarbonate (Perkadox 24 L) [meq/100 g PP] | | | |
|---|---|---|---|---|
| | 0 (standard PP) | 0.09 | 0.175 | 0.445 |
| Tensile Modulus [MPa] | 728 | 850 | 869 | 922 |
| Tensile Yield | 24.8 | 25.4 | 25.7 | 27.0 |

TABLE 2-continued

| | Concentration Peroxydicarbonate (Perkadox 24 L) [meq/100 g PP] | | | |
|---|---|---|---|---|
| | 0 (standard PP) | 0.09 | 0.175 | 0.445 |
| Stress [MPa] Charpy Impact @ 23° C. [kJ/m$^2$] | 64 | 66 | 68 | 59 |

The extent of Polymer branching can indirectly be quantified by shear experiments using Dynamic Oscillatory Rate Sweep (DORS). The value for the Elasticity Ratio (ER) obtained by the DORS analysis of the polymer reflects the extent of the branching. The higher the ER the higher is the branching of the polymer. The DORS measurement are accomplished by using a plate-to-plate shear rheometer measuring continuously the torque and angular position to obtain the total energy G* (complex shear modulus) required to deform the molten polymer. The measurement is conducted at a temperature of 190° C. over a frequency range between 0.025 and 400 rad/s. The corresponding Storage Modulus G' and the Loss Modulus G" are obtained from the complex shear modulus G*. The corresponding Moduli are calculated by G'=G*cos(γ) and G"=G*sin(γ) (γ is the phase shift between the imposed strain and the response of the polymer at the sinusoidal stress input). The ER is based on the relationship between G' and G" as following, ER=1.781E-3 G' (at G"=500 Pa). Table 3 shows an example of the dependency of peroxydicarbonate concentration on ER and hence the extent of branching.

TABLE 3

| | Concentration Peroxydicarbonate (Perkadox 24 L) [meq/100 g PP] | | | | |
|---|---|---|---|---|---|
| | 0 (standard PP) | 0.09 | 0.175 | 0.445 | 0.875 |
| Elasticity Ratio [dyn/cm$^2$] | 1.26 | 1.47 | 1.79 | 2.68 | 3.12 |

Figure 4:
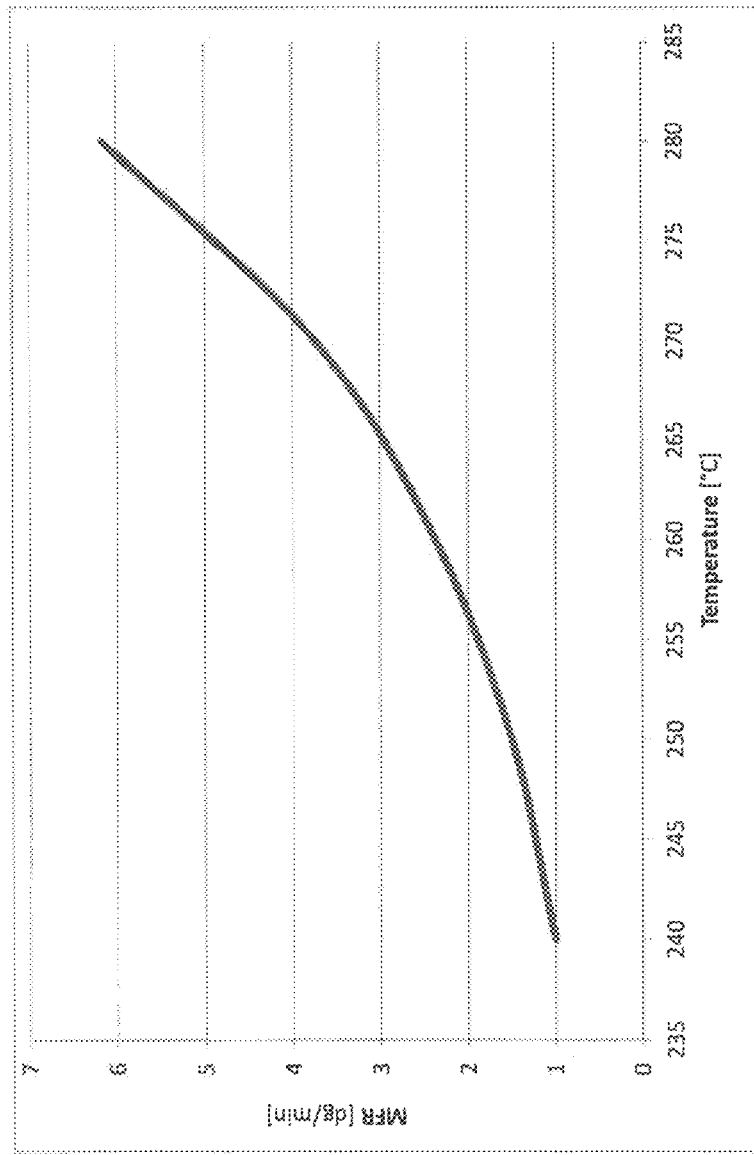
Figure 5:
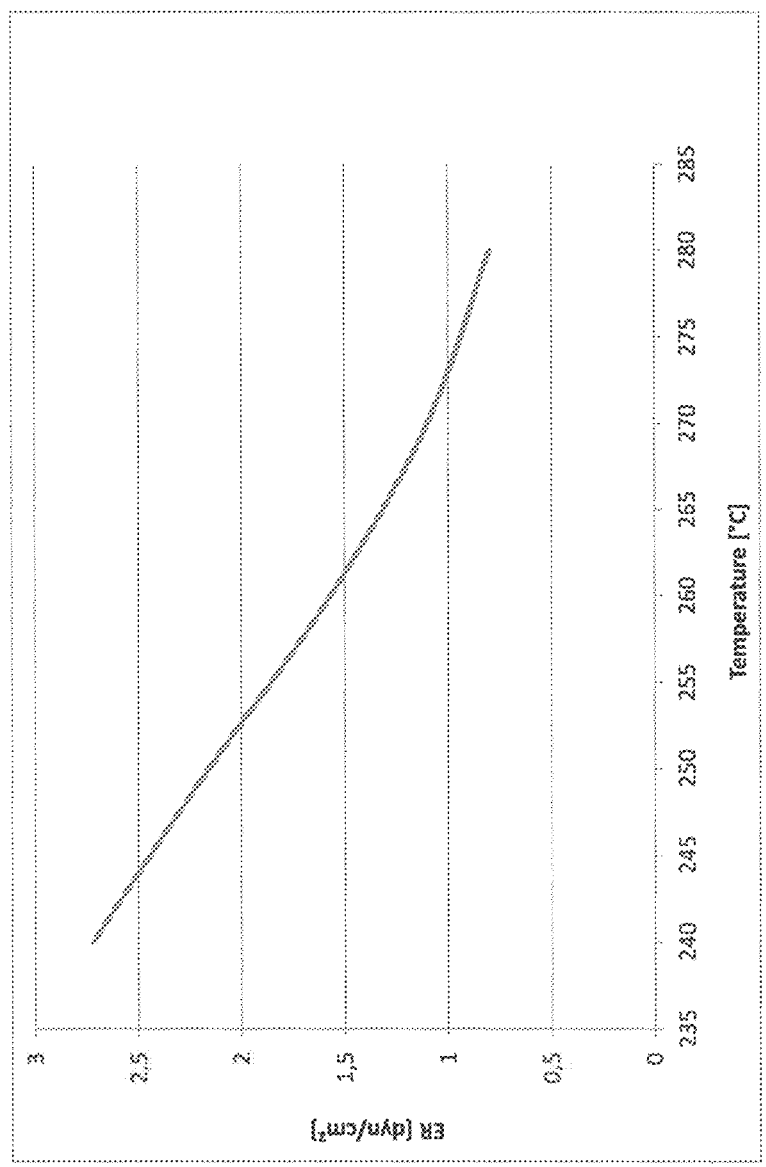

A further aspect of embodiments herein is the distinct temperature sensitivity of the non-crosslinked, peroxydicarbonate-branched polypropylenes described herein. While changing the extruder or nozzle temperature, the extent of branching (ER) and the flow properties (MFR) can be influenced according to the requirements. This special feature provides the possibility to produce or print a finish part with different mechanical sections/fractions (like 2-component injection molding) from only one polymer. Therefore, to take advantage of such properties, a printing nozzle capable of fast temperature changes or a second (or multiple) nozzle with different temperatures settings may be used. FIGS. 4 and 5 show the high temperature dependencies of MFR and branching extent.

The capability of influencing the mechanical properties through temperature dependent branching, within a printed part may eliminate the issue of all additive manufacturing technologies—the un-isotropy of the finish part. This un-isotropy is especially dominant comparing the x-y and z-dimensions due to the fact that the plastic 3D part is build-up in x-y layers.

Changing the mechanical characteristics of the polymer during FFF and APF 3D printing processes can also create preferable direction of force lines. FIGS. 6A-6C demonstrate the influence on the mechanical isotropy that may be achieved using the non-crosslinked, peroxydicarbonate-branched polypropylenes disclosed herein. With the condition that different MFRs or ERs of the resin are providing differences in the mechanical properties (dark areas exhibit different ER and MFR than bright areas), the direction of the main force-lines change according to the intended arrangement.

As described above, embodiments disclosed herein provide for non-crosslinked, peroxydicarbonate-branched polypropylenes and their advantageous use in 3D printing processes, such as Fused Filament Fabrication or ARBURG Plastic Freeforming. The 3D printing non-crosslinked, peroxydicarbonate-branched polypropylene grades show improved extrudability, which is especially important for FFF Additive Manufacturing. The melt stability of polypropylenes herein will support high resolution and thin-wall part printing. The temperature sensitivity of the non-crosslinked peroxydicarbonate-branched polypropylenes allows for an in-process change of the polymer flow properties and structure which enables the printing of single layers or layer sections and thus influencing the mechanical properties (tensile modulus and impact strength) and shrinkage in x-y-z dimensions without changing the polymer.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A process for printing a three-dimensional object, comprising:
   providing a non-crosslinked peroxydicarbonate-branched polypropylene filament, flake, pellet, or powder adapted for one of a fused deposition modeling printer or a fused filament fabrication printer;
   printing the non-crosslinked peroxydicarbonate-branched polypropylene with fused deposition modeling printer or a fused filament fabrication printer to form a three-dimensional article; and
   while printing the non-crosslinked peroxydicarbonate-branched polypropylene:
   (i) extruding the non-crosslinked peroxydicarbonate-branched polypropylene at a first extrusion temperature for a selected portion of the three-dimensional article,
   (ii) extruding the non-crosslinked peroxydicarbonate-branched polypropylene at a second extrusion temperature for another selected portion of the three-dimensional article, and
   (iii) cooling and solidifying the non-crosslinked peroxydicarbonate-branched polypropylene in each of the selected portion and the another selected portion to form the three-dimensional article;
   wherein the non-crosslinked peroxydicarbonate-branched polypropylene, after the cooling and solidifying, has different mechanical properties in the selected portion and the another selected portion; and
   wherein, in the three dimensional article, after cooling and solidification of the non-crosslinked peroxydicarbonate-branched polypropylene, a branching ratio of the non-crosslinked peroxydicarbonate-branched polypropylene as printed in the selected portion is different than a branching ratio of the non-crosslinked peroxydicarbonate-branched polypropylene as printed in the another selected portion.

2. The process of claim 1, wherein the non-crosslinked peroxydicarbonate-branched polypropylene comprises a polypropylene branched by reaction with up to 5 meq/100 g PP peroxydicarbonate.

3. The process of claim 1, wherein the non-crosslinked peroxydicarbonate-branched polypropylene comprises a polypropylene branched by reaction with 0.09 meq/100 g PP to 1.75 meq/100 g PP peroxydicarbonate.

4. The process of claim 1, wherein the non-crosslinked peroxydicarbonate-branched polypropylene comprises a polypropylene branched by reaction with 0.4 meq/100 g PP to 1.4 meq/100 g PP peroxydicarbonate.

5. The process of claim 1, wherein the non-crosslinked peroxydicarbonate-branched polypropylene comprises a polypropylene branched by reaction with a peroxydicarbonate selected from the group consisting of: bis(4-tert-butylcyclohexyl) peroxydicarbonate, dicetyl peroxydicarbonate, and dimyristyl peroxydicarbonate.

6. The process of claim 1, wherein the non-crosslinked peroxydicarbonate-branched polypropylene is not crosslinked, prior to, during, or after printing.

7. The process of claim 1, wherein the printer comprises two or more extruder heads.

8. The process of claim 7, the process further comprising operating the two or more extruder heads at different temperatures to vary a property of the printed section.

9. The process of claim 7, the process further comprising:
providing a first non-crosslinked peroxydicarbonate-branched polypropylene to a first extruder head; and
providing a second non-crosslinked peroxydicarbonate-branched polypropylene to a second extruder head.

10. The process of claim 9, wherein the first and second non-crosslinked peroxydicarbonate-branched polypropylene are branched by reaction with one or both of different peroxydicarbonates or differing amounts of peroxydicarbonate.

11. The process of claim 1, wherein, in the three dimensional article, after cooling and solidification of the non-crosslinked peroxydicarbonate-branched polypropylene, the selected portion has a different tensile modulus and impact strength than the another selected portion.

* * * * *